Nov. 19, 1968 W. G. SCHARPF 3,412,110
2,3-DIHYDRO-2,2-DIMETHYL-7-NITROBENZOFURAN
Filed March 1, 1965 3 Sheets-Sheet 1
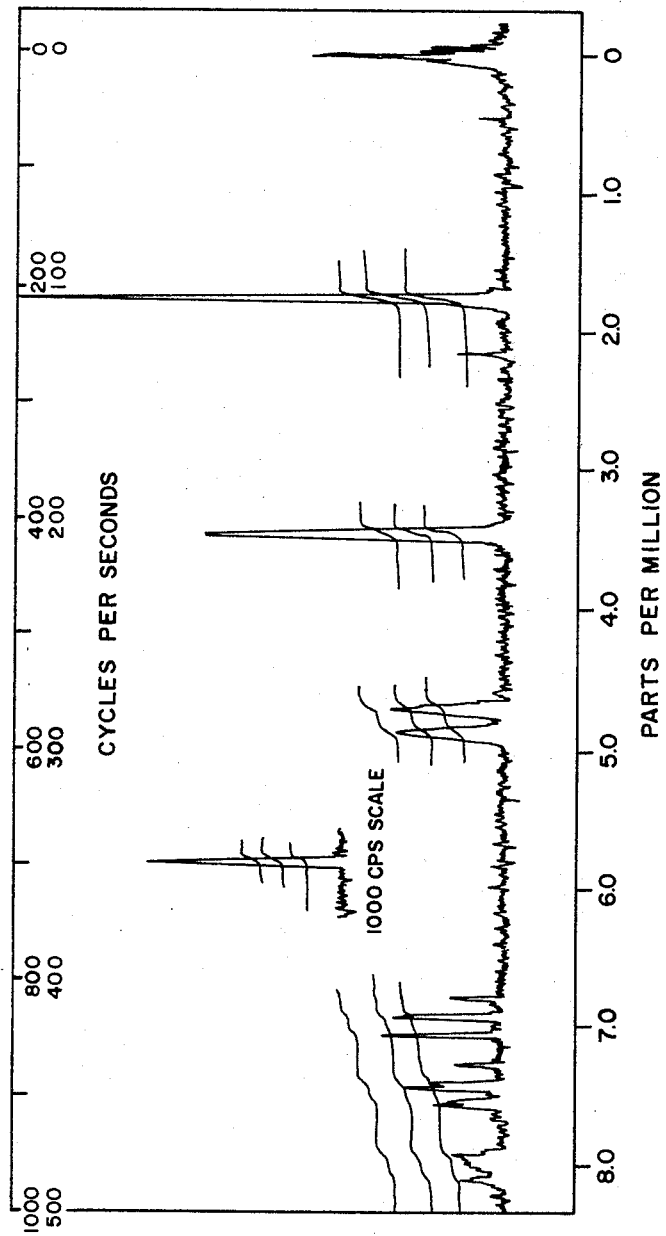
FIG. I.
NUCLEAR MAGNETIC RESONANCE SPECTRUM OF 6-(2-METHALLYL)-2-NITROPHENOL
INVENTOR
WILLIAM G. SCHARPF
BY

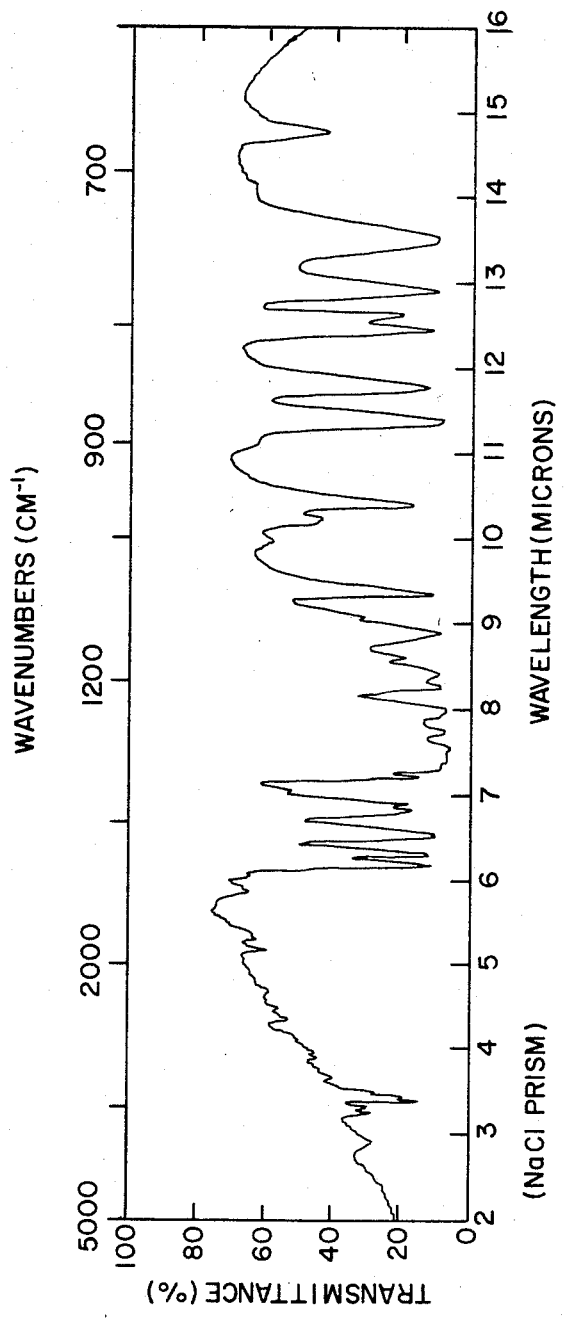

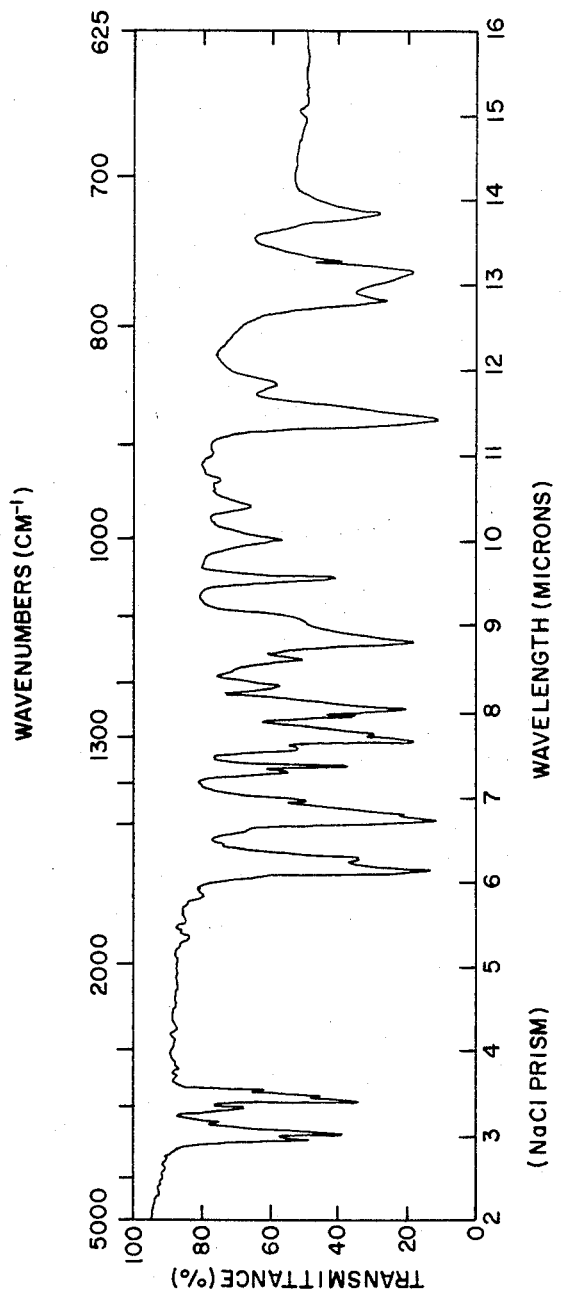

… …

United States Patent Office 3,412,110
Patented Nov. 19, 1968

---

3,412,110
2,3-DIHYDRO-2,2-DIMETHYL-7-NITROBENZOFURAN
William G. Scharpf, West Amwell Township, Hunderton County, N.J., assignor to FMC Corporation, New York, N.Y., a corporation of Delaware
Filed Mar. 1, 1965, Ser. No. 436,169
1 Claim. (Cl. 260—346.2)

This invention relates to new chemical compounds which are particularly useful as chemical intermediates for the synthesis of the insecticidal compound, 2,3-dihydro-2,2-dimethyl-7-benzofuranyl N-methylcarbamate.

The compounds of this invention are 1-(2-methallyloxy)-2-nitrobenzene having the structural formula:

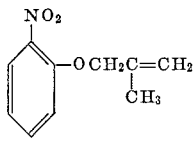

6-(2-methallyl)-2-nitrophenol having the structural formula:

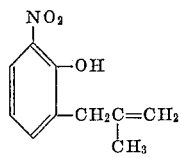

2,3-dihydro-2,2-dimethyl-7-nitrobenzofuran having the structural formula:

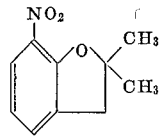

and 7-amino-2,3-dihydro-2,2-dimethylbenzofuran having the structural formula:

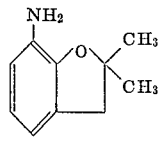

The preparation of these compounds are illustrated in the following examples which are provided by way of illustration and not of limitation.

EXAMPLE 1

Preparation of 1-(2-methallyloxy)-2-nitrobenzene

To a 2-liter flask equipped with a reflux condenser, mechanical stirrer and a dropping funnel was added 400 ml. of acetone, 500 ml. of water, 345 g. (2.5 moles) of o-nitrophenol, and 105 g. (2.6 moles) of NaOH. The mixture was made homogeneous by stirring and warming. Initially 113 g. of methallyl chloride was added batchwise to this mixture followed by an additional 113 g. added dropwise over a period of 10–15 min. until a total of 226 g. (2.5 moles) of methallyl chloride had been added. Stirring was continued for 2.5 hrs. and the mixture was allowed to slowly reflux overnight, after which the upper organic layer was separated from the lower aqueous layer. The aqueous layer was diluted with 500 ml. of water and extracted twice with 100 ml. of methylcyclohexane. The organic extract was added to the organic phase obtained previously and the total organic phase was washed with water, dried over $K_2CO_3$, and distilled to give 283.8 g. of 1-(2-methallyloxy)-2-nitrobenzene, as a yellow liquid boiling at 99–100° C. at 0.42 mm. Hg.

EXAMPLE 2

Preparation of 6-(2-methallyl)-2-nitrophenol

To a 1-liter, 3-neck flask, fitted with an efficient condenser stopped by a Dry-Ice condenser, an inert gas inlet, and a thermometer, 150 g. of 1-(2-methallyloxy)-2-nitrobenzene prepared in Example 1 was added under a nitrogen atmosphere. The flask was then placed in an oil bath which had been preheated to 190° C. When the temperature of the reactant in the flask reached about 185° C., a very rigorous exothermic reaction took place which heated the oil bath to about 250° C. The reaction was allowed to proceed under these conditions for 4 hrs., after which the flask was cooled to room temperature and its contents were transferred to a separatory funnel with the aid of a small amount of benzene. The contents of the separatory funnel were then extracted with 5% NaOH and the resulting aqueous layer was separated and acidified with conc. HCl. The aqueous layer was then extracted with diethyl ether and the organic extract was dried over $MgSO_4$, heated to evaporate the ether, cooled, filtered with the aid of suction and pressing to obtain a brownish solid. The filter cake was washed with n-pentane and the filtrate was concentrated to yield clear yellow-orange crystals melting at 51–51.5° C. The NMR spectrum (FIG. 1) which was run in $CCl_3D$ at 60 mc. indicated the product to be 6-(2-methallyl)-2-nitrophenol.

EXAMPLE 3

Preparation of 2,3-dihydro-2,2-dimethyl-7-nitrobenzofuran

A mixture of 6 g. of 6-(2-methallyl)-2-nitrophenol prepared in Example 2, 40 ml. of acetic acid, and 12 ml. of 45% HBr was heated with stirring and refluxing in a flask emersed in an oil bath at 130° C. The temperature of the reaction mixture was 110° C. After heating for one hour, the contents of the flask were poured into 250 ml. of cold water and the mixture was extracted with diethyl ether. The ether layer was separated, washed with 5% NaOH, dried over $MgSO_4$, and filtered. The filtrate was concentrated and the resulting material was dried by pressing between filter paper to give 4 g. of yellow-brown solid. After successive recrystallizations, once from acetone and twice from an acetone-water mixture, a product having a melting point of 64–65° C. was obtained. An analytical sample was further recrystallized from methanol to give a pale yellow crystalline product having a melting point of 65–66° C. The infrared spectrum (FIG. 2) of 0.5% of this sample in a KBr pellet indicated the product to be 2,3-dihydro-2,2-dimethyl-7-nitrobenzofuran.

*Analysis.*—Calcd.: C, 62.19; H, 5.74. Found: C, 62.45; H, 5.63.

EXAMPLE 4

Preparation of 7-amino-2,3-dihydro-2,2-dimethylbenzofuran

To a flask equipped with a thermometer was added 250 ml. of acetic acid, 47 g. of 6-acetamido-2-(2-methallyl) phenol (prepared from o-acetamidophenol by a procedure similar to that set forth in Examples 1 and 2) and 72 ml. of 48% HBr. The reaction mixture was heated at a temperature of 114° C. for 2 hrs., after which the contents of the flask were poured into 1000 ml. of cold water. The resulting mixture was extracted with diethyl ether and the phases were separated. The aqueous phase was basified with 25% aqueous KOH and extracted with benzene. The resulting organic layer was dried over anhydrous $Na_2CO_3$ and heated under vacuum to evaporate the benzene. The resulting brown viscous liquid was distilled to give 6.5 g. of a clear distillate boiling at 97–98° C. at 1.2 mm. Hg. The infrared spectrum (FIG. 3) of a film of the product indicated that it was 7-amino-2,3-dihydro-2,2-dimethyl-benzofuran.

*Analysis.*—Calcd.: C, 70.22; H, 7.37. Found: C, 70.11; H, 7.60.

The products prepared in the above examples are useful intermediates for the synthesis of 2,3-dihydro-2,2-dimethyl-7-benzofuranyl N-methylcarbamate, an effective pesticide described in my copending application Serial No. 339,612, filed January 23, 1964. The synthesis of this pesticide from the compounds of this invention is described by B. R. Franko-Filipasic in U.S. patent application Ser. No. 436,279, now Patent Number 3,320,286, filed on the same day as the present application.

What is claimed is:
1. 2,3-dihydro-2,2,dimethyl-7-nitrobenzofuran.

References Cited

UNITED STATES PATENTS

| | | | |
|---|---|---|---|
| 2,383,264 | 8/1945 | Lecher et al. | 260—346.2 |
| 2,312,801 | 3/1943 | Craig et al. | 260—612 |
| 2,894,993 | 7/1959 | Schmerling | 260—622 |

NICHOLAS S. RIZZO, *Primary Examiner.*

B. I. DENTZ, *Assistant Examiner.*